United States Patent
Nilsson et al.

(10) Patent No.: US 9,801,350 B2
(45) Date of Patent: Oct. 31, 2017

(54) METHOD AND ARRANGEMENT FOR PERFORMING TEAT RELATED OPERATIONS IN A ROTARY MILKING SYSTEM AND ROTARY MILKING SYSTEM

(71) Applicant: DELAVAL HOLDING AB, Tumba (SE)

(72) Inventors: Mats Nilsson, Tumba (SE); Jonas Hallman, Tumba (SE); Henrik Persson, Tumba (SE); Martin Paley, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 0 days.

(21) Appl. No.: 15/504,690

(22) PCT Filed: Aug. 20, 2015

(86) PCT No.: PCT/SE2015/050885
§ 371 (c)(1),
(2) Date: Feb. 17, 2017

(87) PCT Pub. No.: WO2016/028213
PCT Pub. Date: Feb. 25, 2016

(65) Prior Publication Data
US 2017/0265424 A1   Sep. 21, 2017

(30) Foreign Application Priority Data
Aug. 21, 2014 (SE) .................................. 1450968

(51) Int. Cl.
*A01J 5/003* (2006.01)
*A01K 1/12* (2006.01)
(Continued)

(52) U.S. Cl.
CPC ............. *A01J 5/0175* (2013.01); *A01J 5/007* (2013.01); *A01J 7/04* (2013.01); *A01K 1/126* (2013.01)

(58) Field of Classification Search
CPC  A01K 1/126; A01K 1/12; A01K 1/123; A01J 5/0175
(Continued)

(56) References Cited

U.S. PATENT DOCUMENTS 3,805,741 A  *  4/1974  Thompson ........... A01K 1/0029
                                                    119/14.04
3,835,814 A  *  9/1974  Jacobs .................... A01K 1/126
                                                    119/14.04
(Continued)

FOREIGN PATENT DOCUMENTS

EP   0 689 762 A1    1/1996
EP   2 262 356      12/2010
(Continued)

OTHER PUBLICATIONS

International-Type Search Report, dated Mar. 10, 2015, from corresponding PCT application.
(Continued)

*Primary Examiner* — Yvonne Abbott-Lewis
(74) *Attorney, Agent, or Firm* — Young & Thompson

(57) ABSTRACT

A method for performing teat related operations in a rotary milking system during an operation condition when a capacity required for performing the operations with respect to the teats of the milking animals is higher than a robot's capacity, includes estimating a required capacity for performing the operations; planning a semi-automated teat related operation procedure based on the robot's capacity and the estimated required capacity, according to which procedure a first fraction of the operations with respect to the teats of the
(Continued)

milking animals should be performed automatically by the robot in a first zone, and a second fraction of the operations with respect to the teats of the milking animals should be performed manually in a second zone adjacent to the first zone; and performing the operations with respect to the teats of the milking animals according to the planned semi-automated teat related operation procedure.

20 Claims, 2 Drawing Sheets

(51) Int. Cl.
 *A01J 5/017* (2006.01)
 *A01J 5/007* (2006.01)
 *A01J 7/04* (2006.01)
(58) Field of Classification Search
 USPC .................................. 119/14.04, 14.02, 14.08
 See application file for complete search history.

(56) References Cited

U.S. PATENT DOCUMENTS

| | | | | |
|---|---|---|---|---|
| 3,921,586 | A * | 11/1975 | Sweeney | A01K 1/0029 119/14.04 |
| 3,934,551 | A * | 1/1976 | Sulzberger | A01K 1/126 119/14.04 |
| 4,005,680 | A * | 2/1977 | Lole | A01J 5/017 119/14.08 |
| 4,276,459 | A * | 6/1981 | Willett | H01H 9/06 200/327 |
| 4,918,266 | A * | 4/1990 | Dalebout | H01H 3/20 200/52 R |
| 5,113,043 | A * | 5/1992 | Morris | H01H 9/282 200/43.01 |
| 5,606,932 | A | 3/1997 | Van Der Lely | |
| 6,322,326 | B1 * | 11/2001 | Davis | F04D 13/08 417/279 |
| 6,435,247 | B1 * | 8/2002 | Kerr | B32B 37/1027 100/151 |
| 6,552,659 | B1 * | 4/2003 | Waltz | E05B 83/36 340/438 |
| 9,480,237 | B2 * | 11/2016 | Birk | A01J 5/0175 |
| 2003/0150389 | A1 | 8/2003 | Christensen | |
| 2009/0145364 | A1 * | 6/2009 | Hardy | A01K 1/0613 119/14.04 |
| 2010/0031889 | A1 * | 2/2010 | Eriksson | A01K 1/126 119/14.02 |
| 2010/0095893 | A1 * | 4/2010 | Kallen | A01K 1/126 119/14.04 |
| 2010/0236485 | A1 * | 9/2010 | Axelsson | A01K 1/126 119/14.02 |
| 2011/0214612 | A1 * | 9/2011 | Andersson | A01K 1/126 119/14.04 |
| 2011/0308469 | A1 | 12/2011 | Vollmer et al. | |
| 2012/0103266 | A1 | 5/2012 | Nilsson | |
| 2012/0298043 | A1 | 11/2012 | Birk et al. | |
| 2013/0153360 | A1 * | 6/2013 | Obermuller | F16D 63/00 192/129 R |
| 2013/0167775 | A1 | 7/2013 | Van De Walle | |
| 2013/0239897 | A1 | 9/2013 | Birk et al. | |
| 2014/0158065 | A1 * | 6/2014 | Axelson | A01K 1/12 119/843 |
| 2014/0331934 | A1 * | 11/2014 | Eriksson | A01K 1/12 119/14.04 |
| 2015/0047676 | A1 * | 2/2015 | Nilsson | A01K 1/126 134/18 |

FOREIGN PATENT DOCUMENTS

| | | |
|---|---|---|
| WO | 2007/142586 A1 | 12/2007 |
| WO | 2009/093965 A1 | 7/2009 |
| WO | 2009/113884 A2 | 9/2009 |
| WO | 2014/107134 A1 | 7/2014 |

OTHER PUBLICATIONS

International Search Report, dated Nov. 25, 2015, from corresponding PCT application.

* cited by examiner

METHOD AND ARRANGEMENT FOR PERFORMING TEAT RELATED OPERATIONS IN A ROTARY MILKING SYSTEM AND ROTARY MILKING SYSTEM

TECHNICAL FIELD OF THE INVENTION

The present invention relates generally to dairy farming. Particularly, the invention relates to methods and arrangements for performing teat related operations in a rotary milking system, and to rotary milking systems.

BACKGROUND OF THE INVENTION

US2011/0308469, US2012/103266, WO2009/093965, and US2010/031889 disclose fully or semi automated rotary milking systems wherein automatic teat cup attachment can be performed by the use of a robot. Each of the milking stalls is provided with teat cups with separate milk tubes up to the vacuum/milk separation (i.e. no cluster is present). The robot fetches teat cups, one at a time, from a magazine of each milking stall and attaches them to the teats of an animal present in the milking stall. US 2012/298043 discloses a robot arm usable with the above milking systems.

EP 2262356 discloses another kind of rotary milking system wherein each milking stall comprises teat cups attached to a bowl, which in turn is connected to a single milk tube up to the vacuum/milk separation. A teat cup attachment robot serves each milking stall in order, wherein the cluster with the teat cups of the milking stall are moved to the udder of an animal present in the milking stall, whereupon the teat cups are attached to the teats of the animal.

SUMMARY OF THE INVENTION

However, in some situations, the capacity of a robot is too low for a given size of the rotary milking system or for a given structure of the milking animals to be milked in the rotary milking system, which results in low throughput and efficiency of the rotary milking system.

Such situation may occur for larger sized rotary milking systems or when the milking animals to be milked in the rotary milking system have physical appearances, which render the teat cup attachments more difficult for the robot.

In other situations, the capacity of the robot is too low temporarily, e.g. when the animals to be milked in the rotary milking system are new to the rotary milking system or new to the robot.

Further, the above situations may also occur with respect to other robots, such as robots for cleaning and optionally foremilking the teats of the milking animals present in the milking stalls prior to the milking thereof, and robots for treating, and/or applying a substance onto, the teats of the milking animals present in the milking stalls subsequent to the milking thereof.

An object of this document is to remedy or mitigate the problems disclosed above, and to provide a method and an arrangement for performing teat related operations in a rotary milking system, which are efficient, precise, flexible, and which use a given capacity in the most flexible manner, to thereby increase the throughput and efficiency of the rotary milking system.

In one aspect, a method is provided for performing teat related operations in a rotary milking system comprising a rotating platform, a plurality of milking stalls arranged thereon, each of which being provided with teat cups and provided for housing a milking animal during milking thereof; and at least one robot having a capacity for performing operations with respect to teats of milking animals present in milking stalls of the rotary milking system within a first zone, through which the rotating platform passes once for each revolution the rotary platform rotates, during an operation condition when the capacity required for performing the operations with respect to the teats of the milking animals to be milked in the rotary milking system is higher than the capacity of said at least one robot. The operation condition may be pre-defined for the milking animals to be milked in the rotary milking system, for example the milking animals to be milked in the rotary milking system may belong to a group of milking animals that requires a long period of time to perform teat operations, such as heifers and new cows that are not used to the rotary milking system. The operation condition may also be determined based on historical data for the milking animals to be milked in the rotary milking system. The operation condition is achieved by a management system of the rotary milking system. The operation condition may have been manually entered into the management system by an operator or may be discovered by the management system that stores data of the milking animals to be milked in the rotary milking system, data such as the period of time it takes for the at least one robot to perform operations with respect to the teats of the milking animals present in the milking stalls of the rotary milking system.

According to the method, a capacity required for performing the operations with respect to the teats of the milking animals to be milked in the rotary milking system is estimated. The capacity required for performing the operations with respect to the teats of the milking animals to be milked in the rotary milking system may be estimated based on the number of milking stalls arranged on the rotary platform and the rotational speed of the rotating platform to be used during milking of the milking animals. The more milking stalls arranged on the rotary platform and the higher rotational speed of the rotating platform to be used during milking of the milking animals, the higher capacity is required.

A semi-automated teat related operation procedure is planned based on the capacity of the at least one robot and the estimated required capacity, according to which procedure a first fraction of the operations with respect to the teats of the milking animals should be performed, in the first zone, by the at least one robot automatically, and a second fraction of the operations with respect to the teats of the milking animals should be performed manually in a second zone located adjacent to the first zone.

Finally, the operations with respect to the teats of the milking animals are performed according to the planned semi-automated teat related operation procedure.

The steps of estimating the capacity required for performing the operations and planning the semi-automated teat related operation procedure may be performed automatically in a computer.

By such planning, the capacity of the at least one robot can be used at a maximum, while manual intervention in the operations with respect to the teats of the milking animals is only required when the capacity of the at least one robot falls short of the estimated required capacity. The throughput and efficiency of the rotary milking system will be very high.

The capacity required for performing the operations with respect to the teats of the milking animals to be milked in the rotary milking system may be estimated and the semi-automated teat related operation procedure may be planned at installation of the rotary milking system.

Alternatively or additionally, the method for performing teat related operations may be initiated by an operator that wants to know how much manual labor that will be needed for performing the teat related operations for a certain milking process or session. By initiating the method, the operator will be given the first and second fractions, wherein the second fraction is related to the manual labor required. The milking animals in a dairy farm may be divided into groups, which groups are milked in different milking sessions. Hence, the capacity of the at least one robot may vary from session to session, and manual labor to relieve the at least one robot of some of the tasks may be required for some milking sessions, but not for others.

Yet alternatively or additionally, the method for performing teat related operations may be initiated automatically, e.g. in connection with the start of each milking process or session, e.g. in response to some condition.

Information regarding the second fraction of the operations may be indicated automatically to an operator, to enable, or facilitate for, the operator to perform the second fraction of the operations manually in the second zone. This may be indicated to the operator via a portable device carried by the operator or via indications, e.g. visual indications, at the milking stalls, in which operations with respect to the teats of the milking animals should be performed manually.

Advantageously, the first fraction is determined such that the estimated capacity required for the first fraction of the operations with respect to the teats of the milking animals to be milked in the rotary milking system is lower than the capacity of the at least one robot. Otherwise, the benefits of the planned semi-automated teat related operation procedure are less, since the at least one robot will fail to complete the first fraction of the operations with respect to the teats of the milking animals. By the above provision, it is thus ensured that the capacity of the at least one robot is high enough to perform its tasks.

The capacity of the at least one robot may be dependent on historical teat cup attachment times for (i) the milking animals to be milked in the rotary milking system, (ii) milking animals similar to the milking animals to be milked in the rotary milking system with respect to age, size, lactation phase, health, (iii) milking animals of the same raze as the milking animals to be milked in the rotary milking system, or (iv) any milking animals as determined by use of the automatic teat cup attachment arrangement or one or more automatic teat cup attachment arrangements of the same model as the automatic teat cup attachment arrangement. That is, the capacity of the robot may be different for different milking animals to be milked in the rotary milking system.

The operations with respect to the teats of the milking animals present in milking stalls may comprise attachments of the teat cups of the milking stalls to the teats of the milking animals present in the milking stalls prior to the milking thereof, the cleaning and optionally foremilking of the teats of the milking animals present in the milking stalls prior to the milking thereof, and/or the treatment of, and/or application of a substance onto, the teats of the milking animals present in the milking stalls subsequent to the milking thereof.

In one embodiment, the method is a method for teat cup attachment, the operations with respect to the teats of the milking animals present in milking stalls comprise attachments of the teat cups of the milking stalls to the teats of the milking animals present in the milking stalls prior to the milking thereof, the first fraction of the operations with respect to the teats of the milking animals comprise attachment of a first fraction of the teat cups to teats of milking animals present in milking stalls, and the second fraction of the operations with respect to the teats of the milking animals comprise attachment of a second fraction of the teat cups to teats of milking animals present in milking stalls.

The first fraction of the teat cups may be determined to be the teat cups of every second, every third, every two of three, every three of four, every three of five, or every four of five, of the milking stalls passing the first zone while the rotating platform rotates.

This will ensure an even workflow for both the automatic teat cup attachment arrangement and the operator given the task of manually attaching the second fraction of the teat cups to teats of milking animals.

Alternatively, the first fraction of the teat cups may be determined to comprise the teat cup(s) of each of the milking stalls, which is/are to be attached to one, two, or three of the front and rear teats of a milking animal present in the milking stall, which is/are least accessible to an operator standing in the second zone. Thus, the first fraction of the teat cups may include the teat cup(s) to be attached to one or both of the front teats of the milking animals if the rotary milking system is of parallel type with the ends of the milking animals facing outwardly and the first and second zones being located outside the rotating platform.

This may be a very advantageous solution. An even workflow for both the automatic teat cup attachment arrangement and the operator is ensured, while the automatic teat cup attachment arrangement is dedicated to attach teat cups to the more remotely located teats of milking animals, while the operator is given the task of manually attaching the second fraction of the teat cups to more accessible teats of milking animals.

In one embodiment, the milking animals present in the milking stalls are identified, e.g. when present in the milking stalls or before they enter the milking stalls, and the first fraction of the teat cups is determined based on the identities of the milking animals in the milking stalls.

A measured or estimated teat cup attachment time required for the attachment of the teat cups to teats of the milking animal by the automatic teat cup attachment arrangement may be retrieved for each of the milking animals, and the first fraction of the teat cups may be determined based on the measured or estimated teat cup attachment times. The first fraction of the teat cups may e.g. be determined to comprise the teat cups of the milking stalls, in which the milking animals having the shortest measured or estimated teat cup attachment times are present.

Hereby, the automatic teat cup attachment arrangement is dedicated to attach teat cups to teats of milking animals with shortest measured or estimated teat cup attachment times, which means that the automatic teat cup attachment arrangement will have a high capacity for attaching many teat cups.

Alternatively, a measured or estimated health parameter may be retrieved for each of at least some of the milking animals, and the first fraction of the teat cups may be determined based on the measured or estimated health parameters. The first fraction of the teat cups may e.g. be determined to comprise teat cups of milking stalls, in which healthy milking animals are present.

Hereby, the operator is left to attach teat cups to teats of unhealthy milking animals. In some situations, such milking animals should not be milked at all in the rotary milking system, or should at least not be milked together with healthy milking animals. Such milking animals may thus not be milked, or they may be milked with separate milking machines with buckets, or they may be milked by the rotary milking system, especially if it is equipped with capacities to divert such milk to separate location and thus not mix it with milk from other healthy milking animals milked by the rotary milking system.

In another embodiment, the method is a method for cleaning and optionally foremilking the teats of the milking animals to be milked in the rotary milking system, and the operations with respect to the teats of the milking animals present in milking stalls comprise the cleaning and optionally foremilking of the teats of the milking animals present in the milking stalls prior to the milking thereof.

In yet another embodiment, the method is a method for treating the teats of the milking animals to be milked in the rotary milking system, and the operations with respect to the teats of the milking animals present in milking stalls comprise the treatment of, and/or application of a substance onto, the teats of the milking animals present in the milking stalls subsequent to the milking thereof.

A second aspect refers to an arrangement for performing teat related operations in a rotary milking system of the above disclosed type comprising the at least one robot having a capacity for attaching teat cups to teats of milking animals present in the milking stalls prior to the milking thereof within a first zone, through which the rotating platform passes once for each revolution the rotary platform rotates, and a control arrangement for controlling the at least one robot, during an operation condition when the capacity required for performing the operations with respect to the teats of the milking animals to be milked in the rotary milking system is higher than the capacity of said at least one robot.

The control arrangement comprises first to third modules. A first module is configured to estimate a capacity required for performing the operations with respect to the teats of the milking animals to be milked in the rotary milking system.

A second module is configured to plan a semi-automated teat related operation procedure based on the capacity of the at least one robot and the estimated required capacity, according to which procedure a first fraction of the operations with respect to the teats of the milking animals should be performed, in the first zone, by the at least one robot automatically, and a second fraction of the operations with respect to the teats of the milking animals should be performed manually in a second zone located adjacent to the first zone.

A third module configured to control the at least one robot to perform the first fraction of the operations with respect to the teats of the milking animals automatically.

The arrangement may comprise a device, arrangement or system configured to indicate, to an operator, information regarding the second fraction of the operations to enable, or facilitate for, the operator to perform the second fraction of the operations manually in the second zone.

A third aspect refers to a rotary milking system comprising the arrangement for performing teat related operations of the second aspect.

The various embodiments and alternatives disclosed with respect to the first aspect may also be applicable to the second and third aspects, i.e. the arrangement for teat cup attachment and the milking system, after straight-forward modifications.

Further characteristics of the invention and advantages thereof will be evident from the following detailed description of embodiments.

DETAILED DESCRIPTION OF THE DRAWINGS

DETAILED DESCRIPTION OF EMBODIMENTS

The documents cited in the background give examples of milking systems, and portions thereof, for which the present invention may be applied. All these documents, as well as references therein, are hereby incorporated by reference.

Figure 1:
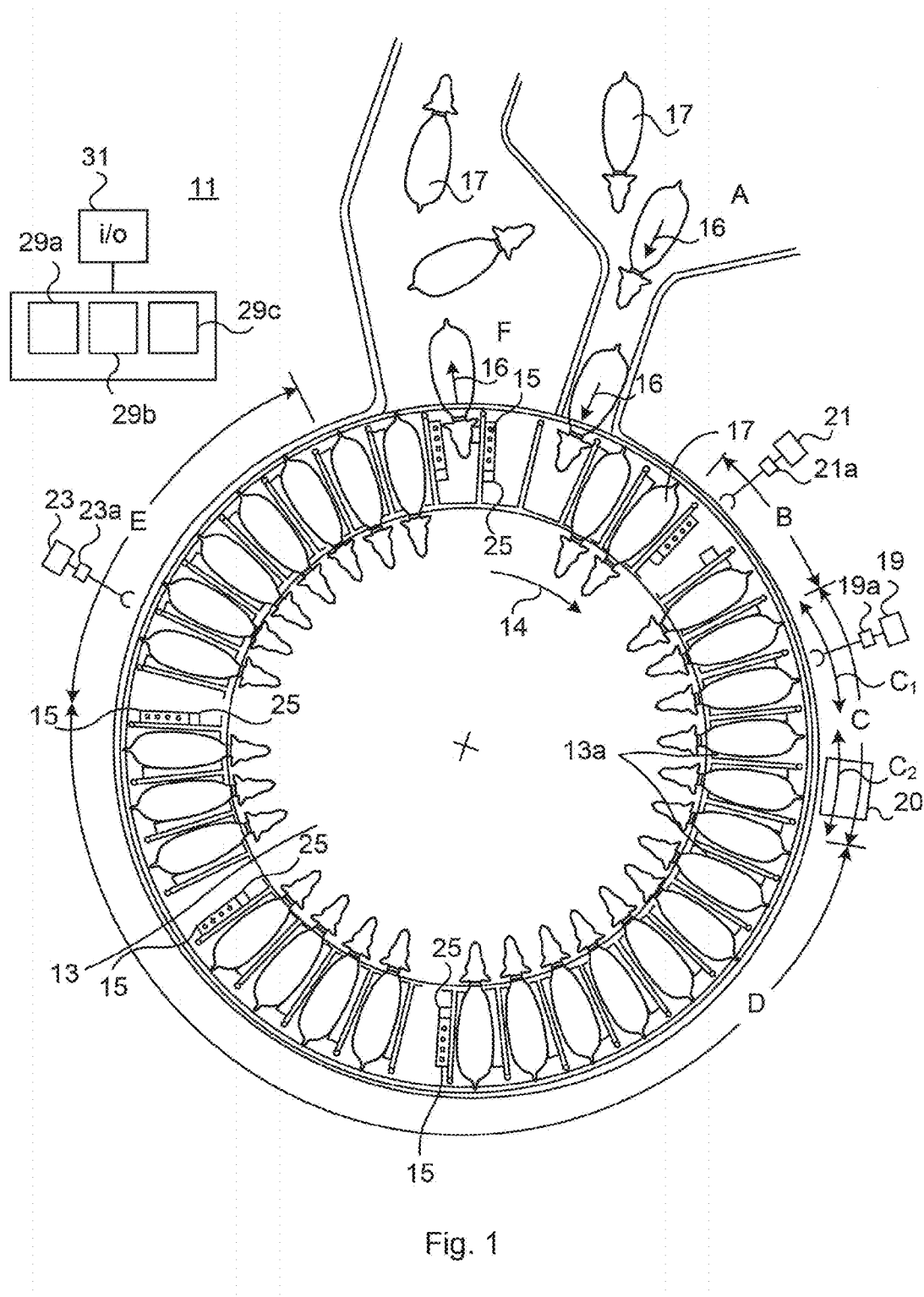
FIG. 1 is a schematic of a rotary milking system according to an embodiment.

FIG. 1 shows a semi-automated rotary milking system 11 comprising a rotating platform 13, which rotates during milking. A plurality of milking stalls 13*a* are arranged on the rotating platform 13, each of which being provided with milking equipment and being arranged to house a milking animal 17 during milking thereof, while the rotating platform 13 rotates. The milking equipment comprises teat cups 15 stored in a magazine 25 and to be attached to the milking animal 17 prior to milking thereof, and optionally one or more separate teat cups for cleaning and/or foremilking (not illustrated).

Generally, the rotary milking system 11 is divided into six zones A-F comprising an entrance zone A wherein the milking animals 17 enter the milking stalls 13*a* in a serial order as the rotating platform rotates in accordance with arrow 14, a pre-milking teat treatment zone B wherein the teats of the milking animals 17 present in the milking stalls 13*a* are treated prior to the milking thereof, a teat cup attachment zone C wherein teat cups 15 of the milking stalls 13*a* are attached to the milking animals 17 present in the milking stalls 13*a*, a milking zone D wherein the main milking takes place, a post-milking teat treatment zone E wherein the teats of the milking animals 17 present in the milking stalls 13*a* are treated subsequent to the milking thereof, and an exit zone F wherein the milking animals 17 leave the milking stalls 13*a* and the rotating platform 13. The traffic of milking animals 17 in and out of the rotary milking system 11 is indicated by arrows 16.

The pre- and post-milking teat treatment zones B, E may be optional and other zones may exist.

The pre-milking teat treatment zone B may house an automatic pre-milking teat treatment arrangement 21, such as a robot equipped with a camera 21*a* and arranged to treat, e.g. clean and/or foremilk, the teats of the milking animals 17 present in the milking stalls 13*a* prior to the milking thereof including attaching the one or more separate teat cups for cleaning and/or foremilking to teats of milking animals 17 present in milking stalls 13*a*. The pre-milking teat treatment may be performed at least partly manually or semi-manually. In particular, some of the one or more separate teat cups for cleaning and/or foremilking may be attached manually to teats of milking animals 17 present in milking stalls 13*a*.

The teat cup attachment zone C comprises two adjacent zones C1 and C2. In the zone C1, an automatic teat cup attachment arrangement 19, such as a robot equipped with a camera 19*a* having a capacity for automatically fetching teat cups 17 from magazines 25 of milking stalls 13*a* and attaching them to teats of milking animals 17 present in milking stalls 13*a* prior to the milking thereof. The zone C1 may house one or more such robots. The zone C2 is a zone, in which teat cups are attached manually to teats of milking animals present in milking stalls 13*a* prior to the milking thereof. The zone C2 may comprise a lowered floor zone 20 to enable an operator to stand upright while attaching teat cups 17 of milking stalls 13a to teats of milking animals 17.

Upon completion of the milking of the milking animals 17 in the milking zone D, the teat cups 15 of the milking stalls 13a should be returned to the magazines 25. To this end, an automatic teat cup returning arrangement (not illustrated) may be provided. The automatic teat cup returning arrangement may be implemented in any of a plurality of known manners.

The post-milking teat treatment zone E may house an automatic post-milking teat treatment arrangement 23, such as a robot equipped with a camera 23a and arranged to treat, e.g. disinfect, the teats of the milking animals 17 present in the milking stalls 13a subsequent to the milking thereof. Alternatively, the post-milking teat treatment may be performed manually or semi-manually.

Further, the rotary milking system 11 comprises a control arrangement 29, which may be connected to an input and output device 31. The control arrangement 29 may be responsible for the control of the operation of the rotary milking system 11. To this end, various components of the rotary milking system 11 may be operatively connected to the control arrangement 29. It shall be appreciated that the control arrangement 29 may include one or more computers interconnected with one another.

In particular, the control arrangement 29 comprises planning capability for a semi-automated teat cup attachment procedure.

To this end, the control arrangement 29 comprises a first module 29a, a second module 29b, and a third module 29c.

The first module 29a is configured to estimate a teat cup attachment capacity required for the attachment of teat cups 15 to the teats of milking animals 17 to be milked in the rotary milking system 11, which is higher than the capacity of the automatic teat cup attachment arrangement 19.

The second module 29b is configured to plan a semi-automated teat cup attachment procedure based on the teat cup attachment capacity of the automatic teat cup attachment arrangement 19 and the estimated required teat cup attachment capacity, according to which a first fraction of the teat cups 15 should be attached automatically to teats of milking animals 17 by the at least one robot in the first zone C1, and a second fraction of the teat cups 15 should be attached to teats of milking animals 17 manually in the second zone C2.

The third module 29c is configured to control the automatic teat cup attachment arrangement 19 to attach the first fraction of the teat cups 15 to teats of the milking animals 17 to be milked in the rotary milking system 11.

In order for the automatic teat cup attachment arrangement 19 to be capable of performing its tasks, the first fraction is determined such that the estimated teat cup attachment capacity required for the attachment of the first fraction of the teat cups 15 to teats of milking animals 17 to be milked in the rotary milking system 11 is lower than the determined teat cup attachment capacity of the automatic teat cup attachment arrangement 19.

The teat cup attachment capacity of the automatic teat cup attachment arrangement 19 may be determined based on historical teat cup attachment times for (i) the milking animals 17 to be milked in the rotary milking system 11, (ii) milking animals similar to the milking animals 17 to be milked in the rotary milking system 11 with respect to age, size, lactation phase, health, (iii) milking animals of the same raze as the milking animals 17 to be milked in the rotary milking system 11, or (iv) any milking animals as determined by use of the automatic teat cup attachment arrangement 19 or one or more automatic teat cup attachment arrangements of the same model as the automatic teat cup attachment arrangement.

The teat cup attachment capacity required for the attachment of teat cups 15 to the teats of milking animals 17 to be milked in the rotary milking system 11 may be estimated depending on the number of milking stalls arranged on the rotary platform and the rotational speed of the rotating platform 13 to be used during milking of the milking animals.

The control arrangement 29 may be configured to indicate e.g. via the input and output device 31, to an operator, information regarding the second fraction of the teat cups 15 to enable, or facilitate for, the operator to attach the second fraction of the teat cups 15 to teats of milking animals 17 manually in the second zone C2.

Alternatively, each of the milking stalls 13a comprise an indicating device (not illustrated) for indicating, e.g. by light, to an operator, if the milking stall 13a comprises one or more teat cups 15 that should be attached to teats of milking animals 17 manually in the second zone C2. Each of the indicating devices may comprise four indicating units, e.g. lamps, indicating, for each of the teat cups 15 of the milking stall 13a, whether that teat cup should be attached to a teat of a milking animal 17 manually in the second zone C2 or not.

While such indicators may give clear indications of teat cups 15 that should be attached to milking animals 17 manually in the second zone C2, the operator may easily see by his/her own eyes which teat cups the automatic teat cup attachment arrangement 19 has left for manual attachment in the second zone C2 since the first and second zones C1, C2 are arranged such that each milking stall 13a passes the first zone C1 before the second zone C2 during rotation of the rotating platform 13.

The first fraction of the teat cups 15 may comprise the teat cups 15 of every second, every third, every two of three, every three of four, every three of five, or every four of five, of the milking stalls 13a passing the first zone while the rotating platform 13 rotates.

Alternatively, the first fraction of the teat cups is determined to comprise the teat cups 15 of each of the milking stalls 13a, which are to be attached to one, two, or three of the front and rear teats of a milking animal present in the milking stalls 13a, which are least accessible to an operator standing in the second zone C2. In the illustrated rotary milking system, the front teats would be less accessible than the rear teats.

Yet alternatively, there may be provided an identification arrangement (not illustrated) for identifying milking animals 17 in the milking stalls 13a, wherein the first fraction of the teat cups 15 may be determined based on the identities of the milking animals 17 in the milking stalls 13a. The milking animals may be identified before they enter the milking stalls 13a or when they are present in the milking stalls 13a by any kind of suitable identification arrangement. In the former case, the milking animals may be identified serially as they enter the rotating platform 13 of the rotary milking stall 11.

For each of the milking animals, a measured or estimated teat cup attachment time required for the attachment of the teat cups 15 to teats of the milking animal 17 by the automatic teat cup attachment arrangement 19 may be retrieved, and the first fraction of the teat cups may be determined based on the measured or estimated teat cup attachment times. In particular, the first fraction of the teat cups 15 may comprise teat cups 15 of the milking stalls 13a, in which milking animals 17 having the shortest measured or estimated teat cup attachment times are present.

Alternatively, for each of at least some of the milking animals, a measured or estimated health parameter may be retrieved, and the first fraction of the teat cups may be determined based on the measured or estimated health parameters. In particular, the first fraction of the teat cups may comprise teat cups of milking stalls, in which healthy milking animals are present.

It shall be appreciated that the above concept may also be applied to the use of the automatic pre-milking teat treatment arrangement 21 in the pre-milking teat treatment zone B, each of the milking stalls 13a may be equipped with one or more separate cleaning and/or foremilking teat cups for cleaning and/or foremilking as mentioned above. If such one or more cleaning and/or foremilking teat cups of each milking stall 13a can be attached either by a robot or manually, the concept can be directly applied in the control arrangement 29.

A cleaning and/or foremilking teat cup attachment capacity of the robot of the automatic pre-milking teat treatment arrangement 21 is retrieved and a cleaning and/or foremilking teat cup attachment capacity required for the attachment of cleaning and/or foremilking teat cups to the teats of milking animals is estimated, which is higher than the cleaning and/or foremilking teat cup attachment capacity of the robot.

A semi-automated cleaning and/or foremilking teat cup attachment procedure is planned based on the determined cleaning and/or foremilking teat cup attachment capacity and the estimated required cleaning and/or foremilking teat cup attachment capacity, according to which procedure a first fraction of the cleaning and/or foremilking teat cups should be attached to teats of milking animals, in a first part of the pre-milking teat treatment zone B, by the robot of the automatic pre-milking teat treatment arrangement 21, and a second fraction of the cleaning and/or foremilking teat cups should be attached to teats of milking animals manually, in a second part of the of the pre-milking teat treatment zone B located adjacent to the first part of the pre-milking teat treatment zone B. Finally, the cleaning and/or foremilking teat cups are attached according to the planned semi-automated cleaning and/or foremilking teat cup attachment procedure.

The inventive concept may be generalized further to an arrangement for performing teat related operations. Such arrangement may have at least one robot having a capacity for performing operations with respect to teats of milking animals present in milking stalls of the rotary milking system within a first zone, through which the rotating platform passes once for each revolution the rotary platform rotates, and a control arrangement for controlling the at least one robot.

The first module is configured to estimate a capacity required for performing the operations with respect to the teats of the milking animals to be milked in the rotary milking system, which is higher than the capacity of the at least one robot. The second module is configured to plan a semi-automated teat related operation procedure based on the capacity of the at least one robot and the estimated required capacity, according to which procedure a first fraction of the operations with respect to the teats of the milking animals should be performed, in the first zone, by the at least one robot automatically, and a second fraction of the operations with respect to the teats of the milking animals should be performed manually in a second zone located adjacent to the first zone. The third module is configured to control the at least one robot to perform the first fraction of the operations with respect to the teats of the milking animals automatically. A device may be provided to indicate automatically, to an operator, information regarding the second fraction of the operations to enable, or facilitate for, the operator to perform the second fraction of the operations manually in the second zone.

The operations may comprise cleaning and optionally foremilking of the teats of the milking animals present in the milking stalls prior to the milking thereof, attachments of the teat cups of the milking stalls to the teats of the milking animals present in the milking stalls prior to the milking thereof, or treatment of, and/or application of a substance onto, the teats of the milking animals present in the milking stalls subsequent to the milking thereof.

Figure 2:
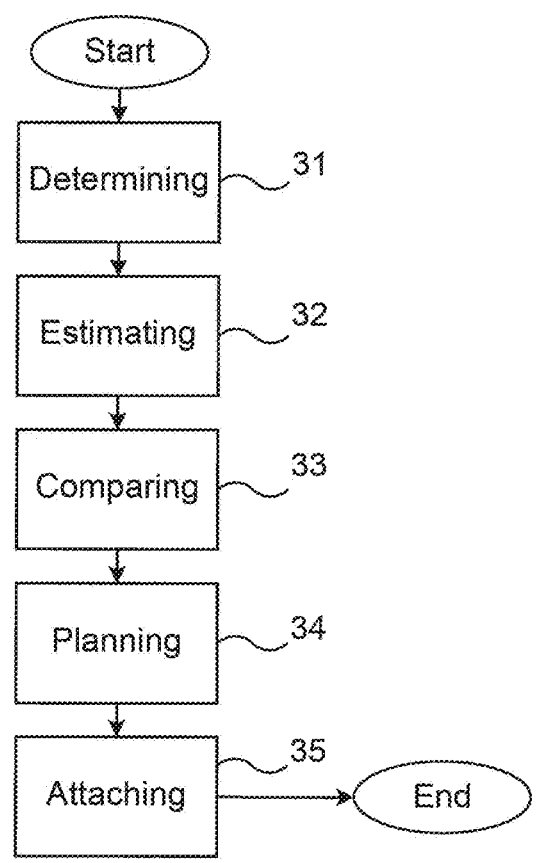
FIG. 2 is a flow scheme of a method according to an embodiment.

With reference next to FIG. 2, a method for teat cup attachment in a rotary milking system is described, wherein the rotary milking system comprises a rotating platform, a plurality of milking stalls arranged thereon, each of which being provided with teat cups and provided for housing a milking animal during milking thereof, an automatic teat cup attachment arrangement suitable to attach teat cups of milking stalls to teats of milking animals present in the milking stalls prior to the milking thereof, wherein the automatic teat cup attachment arrangement comprises at least one robot and is arranged to operate in a first zone, through which the rotating platform passes once for each revolution the rotary platform rotates.

According to the method for teat cup attachment, a teat cup attachment capacity of the automatic teat cup attachment arrangement is, in a step 31, retrieved. A teat cup attachment capacity required for the attachment of teat cups to the teats of milking animals to be milked in the rotary milking system is, in a step 32, estimated. Next, the determined teat cup attachment capacity of the automatic teat cup attachment arrangement is, in a step 33, compared with the estimated required teat cup attachment capacity.

When the determined teat cup attachment capacity falls short of the estimated required teat cup attachment capacity, a semi-automated teat cup attachment procedure is, in a step 34, planned based on the determined teat cup attachment capacity and the estimated required teat cup attachment capacity, according to which procedure a first fraction of the teat cups is attached to teats of the milking animals to be milked in the rotary milking system by the automatic teat cup attachment arrangement in the first zone, and a second fraction of the teat cups is attached to teats of the milking animals to be milked in the rotary milking system manually in a second zone located adjacent to the first zone. Finally, the teat cups are, in a step 35, attached according to the planned semi-automated teat cup attachment procedure, that is, a first fraction of the teacups is attached to teats of the milking animals in the first zone by the automatic teat cup attachment arrangement and a second fraction of the teacups is attached to teats of the milking animals manually in the second zone by one or more operators.

The steps 31 and 33 above may be omitted if the teat cup attachment capacity is already at hand, and if it is known that the estimated required teat cup attachment capacity is higher than the teat cup attachment capacity of the automatic teat cup attachment arrangement.

The various embodiments and alternatives disclosed with reference to FIG. 1 above may also be applicable to the method of FIG. 2, after straight-forward modifications.

In particular, the method for teat cup attachment may be generalized to a method for performing teat related operations in line with the generalization disclosed above.

The scope of the arrangements and methods for performing teat related operations in a rotary milking system is not restricted to the embodiment disclosed above, but may be varied freely within the scope of the claims. In particular, various features of the different embodiments may be combined in other none-disclosed combinations to form yet further embodiments within the scope of the claims.

The invention claimed is:

1. A method for performing teat related operations in a rotary milking system (11) comprising a rotating platform (13), a plurality of milking stalls (13a) arranged thereon, each of the milking stalls (13a) being provided with teat cups (15) and provided for housing a milking animal (17) during milking thereof; and at least one robot (19) having a capacity for performing operations with respect to teats of milking animals present in milking stalls of the rotary milking system within a first zone (C1), through which first zone (C1) the rotating platform passes once for each revolution the rotary platform rotates, during an operation condition when a capacity required for performing the operations with respect to the teats of the milking animals to be milked in the rotary milking system is higher than the capacity of said at least one robot, said at least one robot operatively connected to a control arrangement (29), the control arrangement controlling said at least one robot during the operation condition, the method comprising the steps of:
using the control arrangement (29) to automatically estimate (32) the capacity required for performing the operations with respect to the teats of the milking animals to be milked in the rotary milking system;
using the control arrangement (29) to automatically plan (34) a semi-automated teat related operation procedure based on the capacity of said at least one robot and the estimated required capacity, according to which planned semi-automated teat related operation procedure a first fraction of the operations with respect to the teats of the milking animals should be performed automatically, in the first zone, by said at least one robot, and a second fraction of the operations with respect to the teats of the milking animals should be performed manually in a second zone (C2) located adjacent to said first zone (C1); and
using the at least one robot under control of the control arrangement, automatically performing (35) the operations with respect to the teats of the milking animals according to the planned semi-automated teat related operation procedure.

2. The method of claim 1, wherein the control arrangement (29) comprising a computer, and wherein the steps of estimating the capacity required for performing the operations and planning the semi-automated teat related operation procedure are performed automatically in the computer.

3. The method of claim 1, further comprising indicating automatically, to an operator, information regarding the second fraction of the operation to enable, or facilitate for, the operator to perform the second fraction of the operations manually in the second zone.

4. The method of claim 1, wherein the method is a method for teat cup attachment, the operations with respect to the teats of the milking animals present in milking stalls comprise attachments of the teat cups of the milking stalls to the teats of the milking animals present in the milking stalls prior to the milking thereof, the first fraction of the operations with respect to the teats of the milking animals comprise attachment of a first fraction of the teat cups to teats of milking animals present in milking stalls, and the second fraction of the operations with respect to the teats of the milking animals comprise attachment of a second fraction of the teat cups to teats of milking animals present in milking stalls.

5. The method of claim 4, wherein the first fraction of the teat cups is determined to comprise the teat cups of every second, every third, every two of three, every three of four, every three of five, or every four of five, of the milking stalls passing the first zone while the rotating platform rotates.

6. The method of claim 4, wherein the first fraction of the teat cups is determined to comprise one or more teat cups of each of the milking stalls, which is/are to be attached to one, two, or three of the front and rear teats of a milking animal present in the milking stall, which is/are least accessible to an operator standing in the second zone.

7. The method of claim 6, wherein the first fraction of the teat cups is determined as the teat cups of the milking stalls, in which the milking animals having the shortest measured or estimated teat cup attachment times are present.

8. The method of claim 4, wherein the milking animals present in the milking stalls are identified, in the milking stalls or before they enter the milking stall, and the first fraction of the teat cups is determined based on the identities of the milking animals in the milking stalls.

9. The method of claim 8, wherein,
for each of the milking animals, a measured or estimated teat cup attachment time required for the attachment of the teat cups to teats of the milking animal by the automatic teat cup attachment arrangement is retrieved, and
the first fraction of the teat cups is determined based on the measured or estimated teat cup attachment times.

10. The method of claim 8, wherein,
for each of at least some of the milking animals, a measured or estimated health parameter is retrieved, and
the first fraction of the teat cups is determined based on the measured or estimated health parameters.

11. The method of claim 10, wherein the first fraction of the teat cups is determined to comprise teat cups of milking stalls, in which healthy milking animals are present.

12. The method of claim 4, wherein the capacity of said at least one robot is determined based on historical teat cup attachment times for one of the group consisting of:
(i) the milking animals to be milked in the rotary milking system,
(ii) milking animals similar to the milking animals to be milked in the rotary milking system with respect to age, size, lactation phase, health,
(iii) milking animals of the same raze as the milking animals to be milked in the rotary milking system, and
(iv) any milking animals as determined by use of said automatic teat cup attachment arrangement or one or more automatic teat cup attachment arrangements of the same model as said automatic teat cup attachment arrangement.

13. The method of claim 4, wherein the capacity required for performing the operations with respect to the teats of milking animals to be milked in the rotary milking system is estimated depending on the number of milking stalls arranged on the rotary platform and the rotational speed of the rotating platform to be used during milking of the milking animals.

14. The method of claim 1, wherein the method is a method for cleaning the teats of the milking animals to be milked in the rotary milking system, and the operations with respect to the teats of the milking animals present in milking stalls comprise the cleaning of the teats of the milking animals present in the milking stalls prior to the milking thereof.

15. The method of claim 1, wherein the method is a method for treating the teats of the milking animals to be milked in the rotary milking system, and the operations with respect to the teats of the milking animals present in milking stalls comprise at least one of the group consisting of i) treatment of the teats of the milking animals present in the milking stalls subsequent to the milking thereof, and ii) application of a substance onto, the teats of the milking animals present in the milking stalls subsequent to the milking thereof.

16. An arrangement for performing teat related operations in a rotary milking system (11) comprising:
a rotating platform (13);
a plurality of milking stalls (13a) arranged on the rotating platform, each of the milking stalls (13a) being provided with teat cups (15) and provided for housing a milking animal (17) during milking thereof;
at least one robot (19) having a capacity for performing operations with respect to teats of milking animals present in milking stalls of the rotary milking system within a first zone (C1), through which first zone (C1) the rotating platform passes once for each revolution the rotary platform rotates; and
a control arrangement for controlling said at least one robot, during an operation condition when the capacity required for performing the operations with respect to the teats of the milking animals to be milked in the rotary milking system is higher than the capacity of said at least one robot, the control arrangement comprising
a first module (29a) configured to estimate a capacity required for performing the operations with respect to the teats of the milking animals to be milked in the rotary milking system,
a second module (29b) configured to plan a semi-automated teat related operation procedure based on the capacity of said at least one robot and the estimated required capacity, according to which procedure a first fraction of the operations with respect to the teats of the milking animals should be performed automatically, in the first zone, by said at least one robot, and a second fraction of the operations with respect to the teats of the milking animals should be performed manually in a second zone (C2) located adjacent to said first zone (C1), and
a third module (29c) configured to automatically control said at least one robot to perform the first fraction of the operations with respect to the teats of the milking animals.

17. The arrangement of claim 16, further comprising an indicating arrangement configured to indicate automatically, to an operator, information regarding the second fraction of the operations to enable, or facilitate for, the operator to perform the second fraction of the operations manually in the second zone.

18. The arrangement of claim 16, wherein the arrangement is an arrangement for teat cup attachment, the operations with respect to the teats of the milking animals present in milking stalls comprise attachments of the teat cups of the milking stalls to the teats of the milking animals present in the milking stalls prior to the milking thereof, the first fraction of the operations with respect to the teats of the milking animals comprise attachment of a first fraction of the teat cups to teats of milking animals present in milking stalls, and the second fraction of the operations with respect to the teats of the milking animals comprise attachment of a second fraction of the teat cups to teats of milking animals present in milking stalls.

19. The arrangement of claim 18, wherein the second module is configured to determine the first fraction of the teat cups to comprise the teat cups of every second, every third, every two of three, every three of four, every three of five, or every four of five, of the milking stalls passing the first zone while the rotating platform rotates.

20. The method of claim 1, wherein the method is a method for cleaning and foremilking the teats of the milking animals to be milked in the rotary milking system, and the operations with respect to the teats of the milking animals present in milking stalls comprise the cleaning and foremilking of the teats of the milking animals present in the milking stalls prior to the milking thereof.

* * * * *